UNITED STATES PATENT OFFICE.

GEORGE W. HERBEIN, OF SEATTLE, WASHINGTON.

PROCESS OF MAKING ARTIFICIAL FUEL.

No. 907,998.   Specification of Letters Patent.   Patented Dec. 29, 1908.

Application filed April 3, 1907. Serial No. 366,077.

*To all whom it may concern:*

Be it known that I, GEORGE W. HERBEIN, a citizen of the United States, residing at Seattle, in the county of King and State of Washington, have invented certain new and useful Improvements in Processes of Making Artificial Fuel, of which the following is a specification.

This invention pertains to a process of making artificial fuel, and has for its object to simplify the manufacture and increase the efficiency of the product.

In carrying out the process, I desirably use a hydrocarbon, such as petroleum oil, a combustible absorbent for the oil, such as peat, and a carbohydrate, such as dextrin. By experiment I have found that the composition can be advantageously made with the proportions of twenty per cent. hydrocarbon, seventy-nine per cent. of absorbent material, and one per cent. or less of a carbohydrate, though I do not confine myself to these proportions, as they can be considerably varied to conform to the character of fuel desired, as reducing or increasing its caloric properties.

The carbohydrate is used primarily as a binder to hold the other ingredients together, and as it is more often available in a dry state, water can be added to promote its suffusion through the mass.

In the proportions stated above the materials yield a very satisfactory fuel. Where an extremely rich fuel is desired, however, a proportionately greater amount of hydrocarbon is added, and to overcome the non-adhesive effect of the surplusage of oil thus introduced, I add a salt, such as sal-soda, and desirably in solution, which combining with the oil renders it less greasy and capable of being held together by the gummy character of the carbohydrate.

Certain substances of a carboniferous nature, such as coal dust, may be included in the mixture and held in intimate connection with and as a component of the fuel, thus adding largely to its economic value.

In carrying my process into practice, I first heat the hydrocarbon and mix therewith previously dried absorbent material. I then add the carbohydrate, or, if desired, the carbohydrate and carboniferous material. In supplementing a salt to the above, it is added to the hydrocarbon before the application of heat, thence pursuing the process heretofore described. The mass thus compounded is pressed by molds into briquets while subjected to the action of heat to assist the binding function of the carbohydrate.

What I claim, and desire to secure by Letters-Patent, is—

The herein described process of making artificial fuel which consists in combining in the presence of heat, petroleum oil and dry peat, adding dextrin as a binding agent and subjecting the mixture to pressure while still in the presence of heat.

In testimony whereof I affix my signature in presence of two witnesses.

GEORGE W. HERBEIN.

Witnesses:
PIERRE BARNES,
GUY M. THOMPSON.